(12) United States Patent
Matsuda

(10) Patent No.: US 6,385,347 B1
(45) Date of Patent: May 7, 2002

(54) IMAGE READING SYSTEM

(75) Inventor: Shinya Matsuda, Kyoto (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/042,475

(22) Filed: Mar. 16, 1998

(30) Foreign Application Priority Data

Mar. 18, 1997 (JP) ............................................ 9-064358

(51) Int. Cl.$^7$ ................................................ G06K 9/40
(52) U.S. Cl. ...................................... 382/263; 382/266
(58) Field of Search ................................ 382/260–269, 382/176; 358/462

(56) References Cited

U.S. PATENT DOCUMENTS

| | | | |
|---|---|---|---|
| 5,276,530 A | | 1/1994 | Siegel .......................... 358/406 |
| 5,450,500 A | * | 9/1995 | Brett ............................ 382/162 |
| 5,495,349 A | * | 2/1996 | Ikeda ............................ 358/518 |
| 5,745,909 A | * | 4/1998 | Perlman et al. ............... 707/513 |
| 5,793,900 A | * | 8/1998 | Nourbakhsh et al. ......... 382/263 |

FOREIGN PATENT DOCUMENTS

JP      4-331562      11/1992

OTHER PUBLICATIONS

C&C Information Technology Research Labolatories, NEC Corporation, "Optical Image Sharpening Method Using Edge Sharpness", Akira Inoue and Tajima Johji, 1992, pp. 23–26.

* cited by examiner

Primary Examiner—Thomas D. Lee
Assistant Examiner—Stephen Brinich
(74) Attorney, Agent, or Firm—Sidley Austin Brown & Wood

(57) ABSTRACT

An image reading system provided with an image sensing means to convert the image of an open-faced document to electronic signals in fine division in the viewing direction and a vertical direction intersecting said viewing direction to reduce reading time and regularize the image quality of a read pen-faced document, wherein the pixels having a binarized value of pixel value D(n) among pixels g of an image read by said image sensing means different from the pixels having a binarized value of pixel value D(n+1) of adjacent pixels on one side in a vertical direction are counted as border pixels, the difference ΔD of pixel values is calculated between said border pixels and adjacent pixels on one side thereof, and correction of the pixel values of a pixel array is corrected in accordance with the sharpness of an image quality specified by the sum of said difference and the number of border pixels in a pixel array in a vertical direction for each pixel position in a viewing direction.

13 Claims, 6 Drawing Sheets

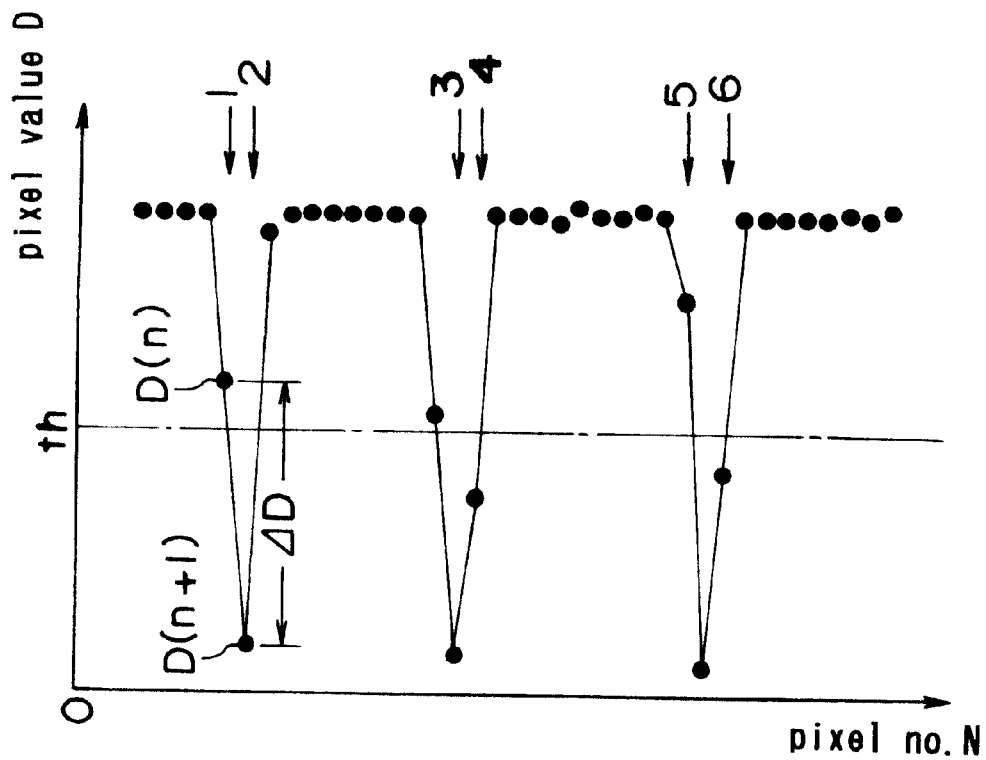
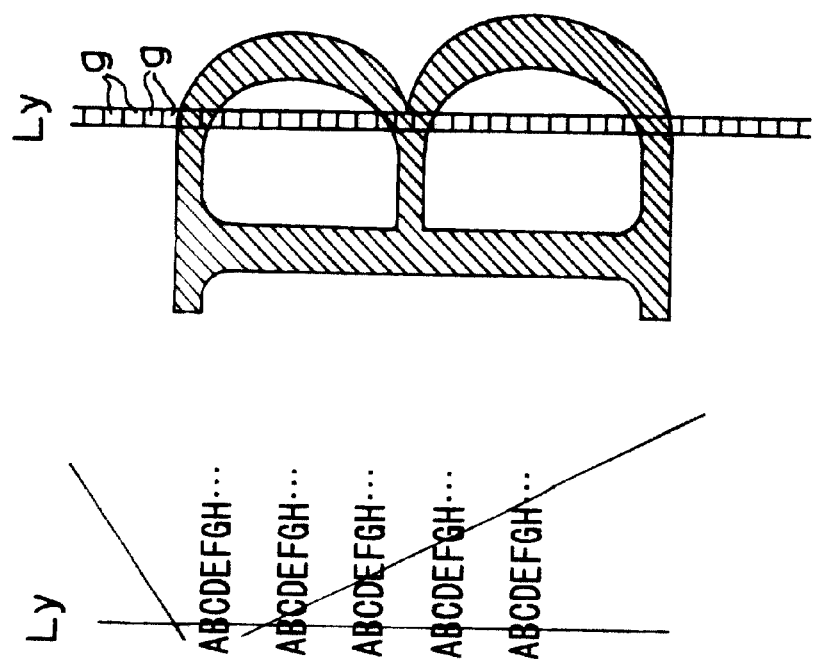
FIG. 5

IMAGE READING SYSTEM

This application is based on Application No. HEI 9-64358 filed in Japan, the content of which is hereby incorporated by reference.

BACKGROUND OF THE INVENTION

1. Field of the Invention

The present invention relates to an image reading system suitable for reading bound documents such as books and magazines.

2. Description of the Related Art

Image readers such as copiers and the like are generally provided with a flat document table so as to copy the image of the sheet document under optimum image forming conditions. Accordingly, when a document such as a book is placed face downward on the document table, the center region in the viewing direction of the open faced document, i.e., the document surface, rises from the document table. The focus becomes defocused in this rising region so as to produce a reduction in image sharpness compared to other regions of the document surface. Japanese Laid-Open Patent No. 4-331562 discloses one method for correcting the aforesaid problem. This method measures the height distribution of the viewing surface via a range sensor, and corrects the reduced image sharpness via data processing in accordance with said measurement result. In image readers wherein a document is placed face upward, i.e., so-called book scanners, a method is used to measure the height distribution of the viewing surface and adjust the focus in conjunction with the progress of the scan in accordance with said measurement result. On the other hand, a proposed method of optimizing the sharpness of natural images utilizes image processing art to calculate the average intensity of the high frequency component in the edge regions in an image as an estimate standard of the sharpness of the entire image, and adjusts the edge highlight processing in accordance with said calculation result (23rd Image Engineering Conference, 1992, pp. 23–26).

In the aforesaid sharpness correction method based on the measured height distribution of the viewing surface, disadvantages in addition to the high cost of including a measurement mechanism arise insofar as the reading time is prolonged by said measurement process. Since the height distribution measurement is not further corrected when a document position is shifted after said measurement has occurred, an operator cannot be certain of the correction result for each reading, which becomes particularly troublesome when reading a plurality of pages.

It is unnecessary to measure the document height distribution in methods which estimate sharpness based on read image information. Since conventional methods of estimating sharpness use the entire image for said estimation, however, such methods are unsuitable for reading a viewing surface which has different degrees of sharpness at different locations. That is, such methods do not eliminate uneven sharpness via edge highlighting based on the average sharpness of an entire image. Furthermore, there is a tendency to excessive edge highlighting in text images having few characters.

SUMMARY OF THE INVENTION

An object of the present invention is to reduce the reading time and produce uniform image quality when reading open-faced documents.

These objects are attained by the image reading system of the present invention as described below.

The present invention provides an image reading system having an image sensing means to convert the image of an open-faced document to electronic signals in fine division in the viewing direction and a vertical direction perpendicular to said viewing direction, said image reading system comprising:

a counting means to count pixels of an image read by said image sensing means, the border pixels having a different binarized value than the binarized value of an adjacent pixel on one side in said vertical direction;

calculation means to calculate the difference of pixel value between each said border pixel and adjacent pixel on one side thereof; and image correction means to correct pixel values in said pixel array in accordance with an image quality specified by the sum of said difference and the number of said border pixels of said pixel array in said vertical direction for each pixel position in said viewing direction.

The present invention further provides an image processing device having a means to detect the degree of sharpness of each of a plurality of regions in an image, and means to correct an image based on said degree of sharpness of each said region.

These and other objects, advantages and features of the invention will become apparent from the following description thereof taken in conjunction with the accompanying drawings which illustrate specific embodiments of the invention.

BRIEF DESCRIPTION OF THE DRAWINGS

FIG. 5 shows a summary of the edge intensity calculation; and

In the following description, like parts are designated by like reference numbers throughout the several drawings.

DESCRIPTION OF THE PREFERRED EMBODIMENTS

Figure 1:
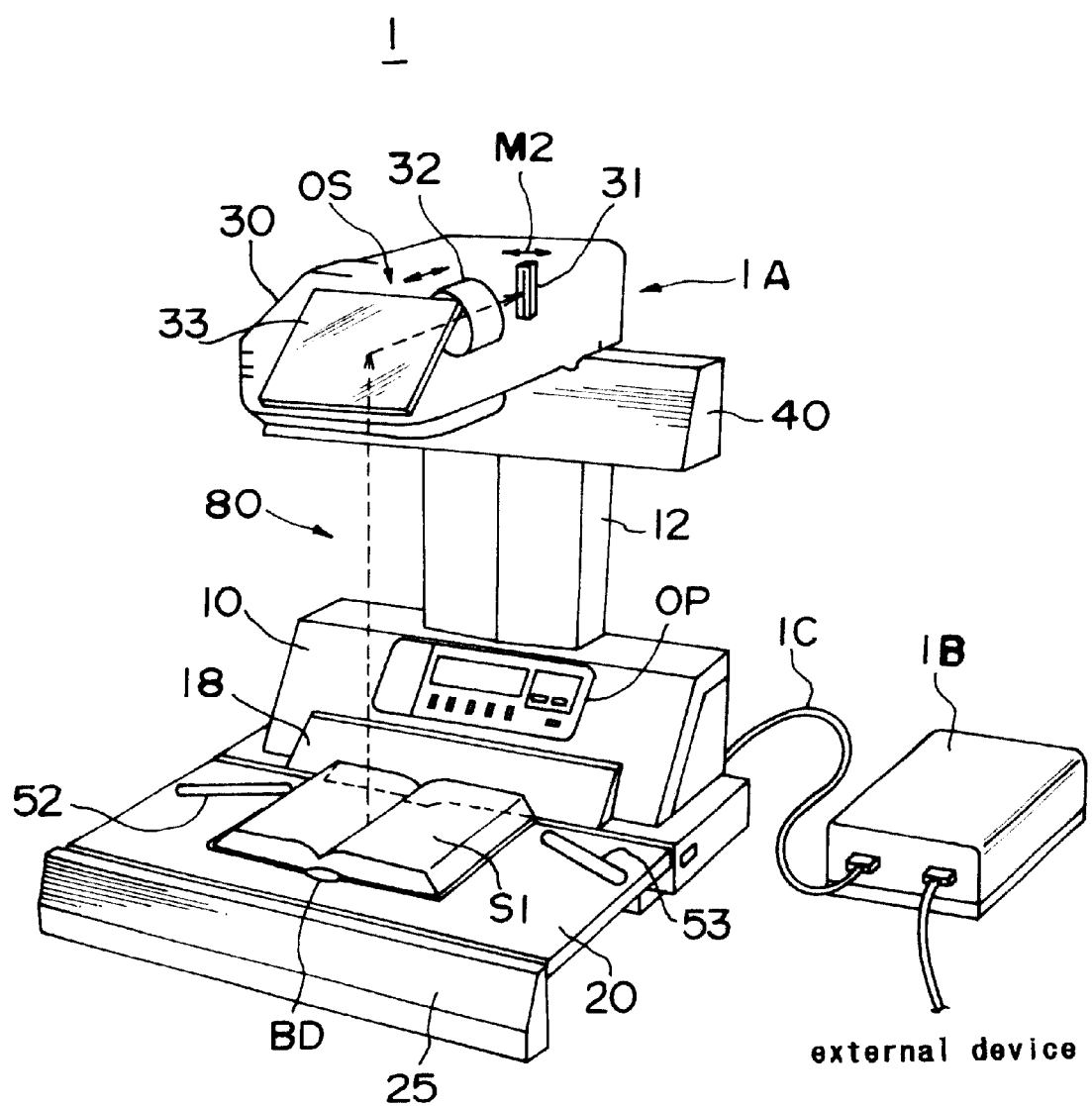
FIG. 1 is a perspective view showing the exterior of the image reading system of the present invention.

FIG. 1 is a perspective view showing the exterior of the image reading system of the present invention.

Image reading system 1 comprises a book scanner 1A suitably constructed to read book documents (i.e., open-faced document) BD such as a book or magazine, data processing unit 1B to temporarily store and correct reading information, and cable 1C connecting said book scanner 1A and said data processing unit 1B, and is connected to an external device not shown in the illustration. Examples of said external device include printers, displays, image memories, image editors (computer systems) and the like.

Book scanner 1A is provided with a housing 10 to accommodate power source circuits and the like, document table 20 to support documents, image sensing unit 30 to convert a document image to electronic signals, and lamp unit 40 to illuminate a document. Document table 20 is arranged on the front side of housing 10. Image sensing unit 30 is arranged above document table 20, and is supported in a cantilever mode via column 12 extending upward from the top surface of housing 10. Lamp unit 40 is mounted on the back side of the bottom surface of image sensing unit 30 to illuminate said document table 20 at an angle from above. Open space 80 between document table 20 and image sensing unit 30 is sufficiently broad to accommodate book document BD. A user can efficiently perform reading operations on a plurality of pages because pages of a document can be turned while said document is placed on document table 20.

An operation panel OP which includes a liquid crystal display is provided at the front top edge of housing 10, and a stopper 18 is mounted at the bottom edge thereof. Start keys 52 and 53 to start a reading operation by a user are provided respectively at bilateral sides of document table 20, and an armrest 25 is provided at the anterior side.

Image sensing unit 30 is provided with a line sensor 31 comprising a charge-coupled device (CCD) array, image forming lens 32, and mirror 33. A document image is projected onto the photoreceptive surface of line sensor 31 via mirror 33 and image forming lens 32. The focus position of image formation is selected on the top surface (height 0 position) of document table 20. The line sensor 31 is mounted on a movable body of a subscanning mechanism (not shown in the drawing), so as to move the line sensor 31 parallel to the width direction (viewing direction) M2 while maintaining the array direction of the CCD elements in the vertical direction. A two-dimensional document image is read by the aforesaid parallel movement. That is, in book scanner 1, a two-dimensional image sensing plane is formed via the movement of line sensor 31. An area sensor alternatively may be used in place of said line sensor 31; in this instance, the photoreceptive surface of the area sensor becomes the image sensing plane. The main scan direction of the document image is the front-to-back direction on document table 20, i.e., the vertical direction on the image sensing plane.

The document placement operation is accomplished by a user setting a book document BD face upward on document table 20. At this time, the right and left page boundary is aligned with a mark indicating the center of document table 20 in a lateral direction, and book document BD is positioned in the front-to-back direction by abutting stopper 18. The boundary between stopper 18 and document table 20 is a standard line for document placement, the center of said standard line being the standard position. A user may manually press bilateral edges of book document BD as necessary to maintain the viewing state. In book scanner 1A, start keys 52 or 53 may be pressed while pressing the document manually.

In reading book document BD via book scanner 1A of the aforesaid construction, there is uneven sharpness of the read image due to differences in the height of the document surface, i.e., viewing surface S1, depending on the position in the viewing direction M2. In particular the image of the areas positioned higher than the depth of field of image forming lens 32 are unsharply focused. Data processing unit 1B has the functions of determining the degree of unsharp focus (i.e., degree of sharpness) from reading information, and correcting image quality.

Figure 2:
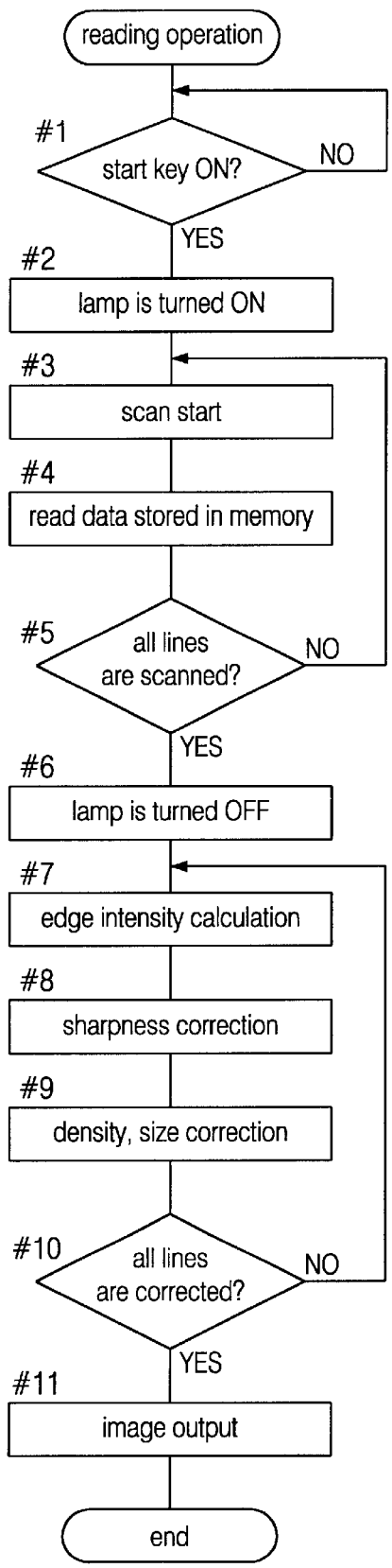
FIG. 2 is a flow chart briefly showing the operation of the image reading system.

FIG. 2 is a flow chart briefly showing the operation of the image reading system.

When either of the pair of start keys 52 or 53 is turned ON after an operation setting operation (#1), the illumination lamp is turned ON (#2), and the main scan starts (#3). In the period of the main scan, read information is sequentially stored in image memory 204 in parallel with the scan (#4). When scanning of all pages ends, the illumination lamp is turned OFF (#5–#6). Thereafter, the edge intensity (E) is calculated for each line (#7), and the degree of sharpness corrected (#8), and other image processing executed (#9). When processing of all lines of the read image ends, image data D2 are output to an external device (#10, #11).

Figure 4:
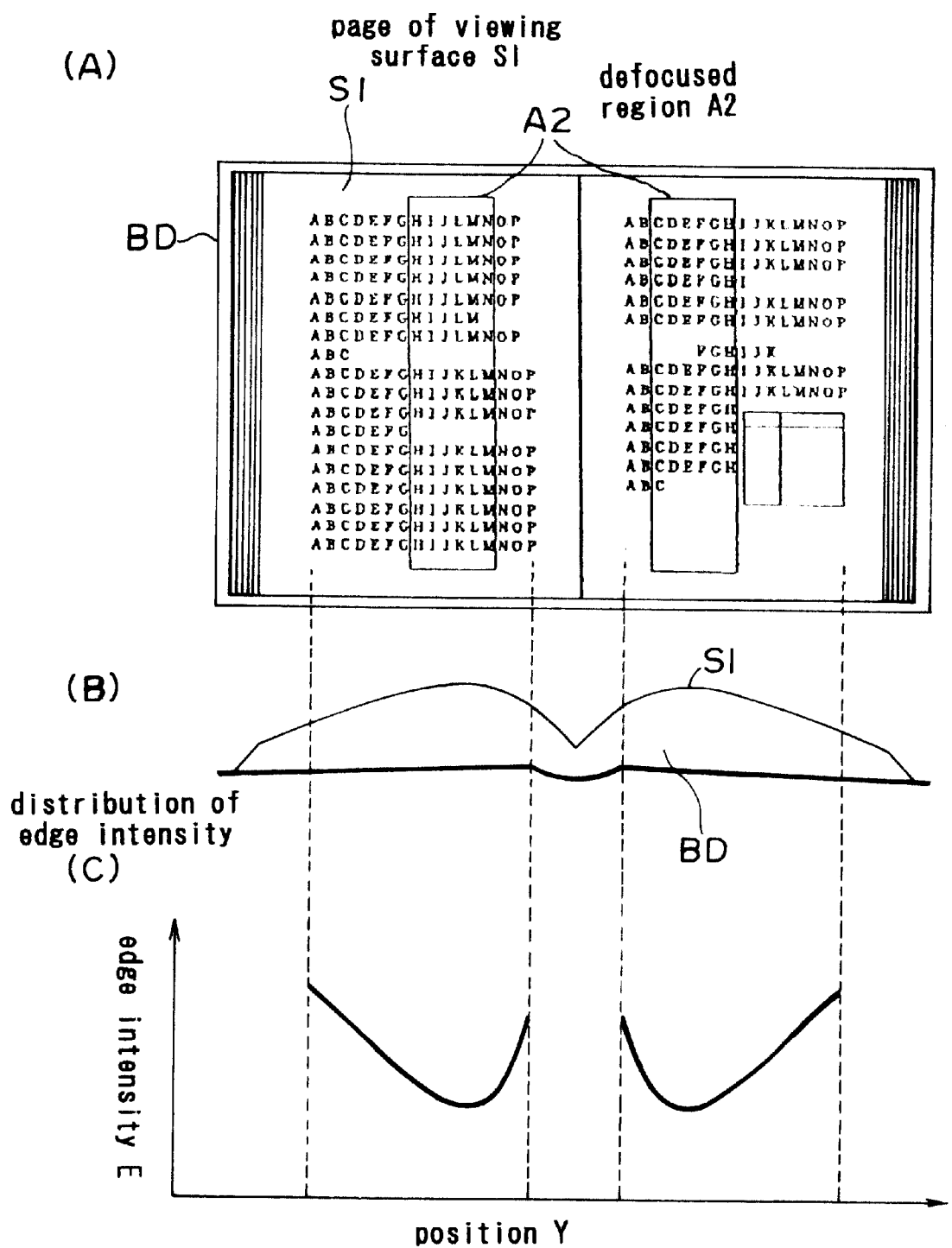
FIGS. 4(a), 4(b) and 4(c) illustrate the relationship between the sharpness distribution and the state of curvature of the viewing surface.

FIGS. 4(a), 4(b) and 4(c) illustrate the relationship between the sharpness distribution and the state of curvature of the viewing surface S1.

In the example book document BD of FIG. 4(A), columns of characters are printed are printed on the left page of viewing surface S1, and columns of characters and a table are printed on the right page. The viewing surface S1 is curved in the viewing direction as shown in FIG. 4(B). In the direction intersecting the viewing direction (i.e., a vertical direction), the viewing surface S1 is virtually flat. Therefore, uneven sharpness is produced in the read image obtained by image sensing of the viewing surface S1 due to the aforesaid curvature, such that a defocused region A2 occurs in the vicinity of the highest position within the viewing surface S1.

Figure 3:
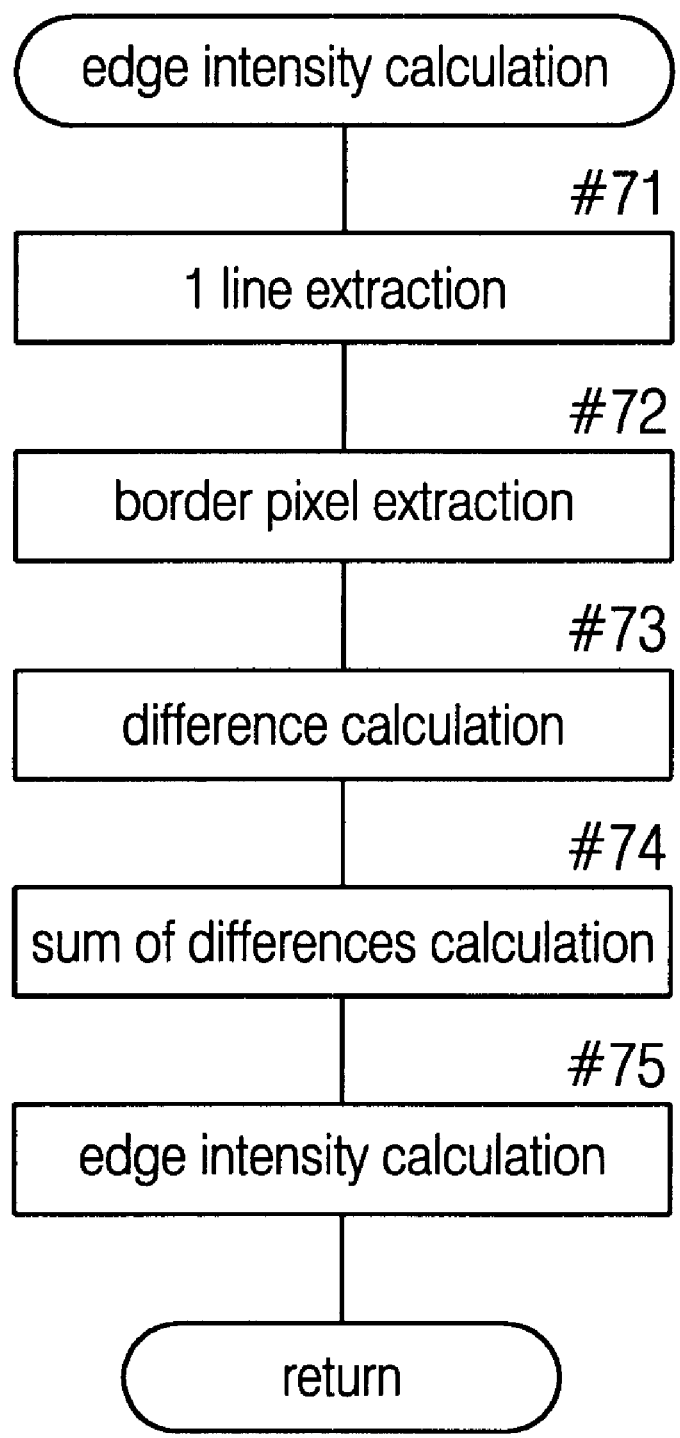
FIG. 3 is a flow chart illustrating the edge intensity calculation.

The edge calculation process (#7) of FIG. 2 is described below with reference to the flow chart of FIG. 3. Image reading system 1 calculates the edge intensity (E) defined by equation (1) below for each sequential line scanned as a sharpness index. In other words, the read information is divided into a plurality of lines and the edge intensity (E) is calculated for each line. Furthermore, the read information is divided into a plurality of blocks which is different from the plurality of lines as well.

$$\text{Edge intensity } (E) = (\text{sum } (S) \text{ of the difference in pixel values})/\text{boundary number } (B) \qquad (1)$$

FIG. 5 shows a summary of the calculation of edge intensity.

First, line Ly comprising one column of pixels g aligned in the main scan direction (vertical direction of book document BD) is extracted from among the pixel units comprising the read image (#71), and the pixel value D is checked for each pixel g sequentially from the first pixel being pixel no. N having a value of 0. The predetermined thresholds th (e.g., the center value in the pixel value range) of pixel values $D(n)$ and $D(n+1)$ of the nth pixel and the following adjacent pixel (i.e., nth+1 pixel) are compared, and when one pixel value exceeds said threshold th and the other pixel value is less than said threshold value th, i.e., when the binarized values of pixel values $D(n)$ and $D(n+1)$ are mutually different from a threshold th, the no. n pixel is designated a "border pixel" corresponding to the edge of the image (#72). Then, the number of border pixels in target line Ly are counted as border pixels. In a line LY having a large number of characters the number of borders (B) will be a relatively high value due to the many lines constructing the characters. Since there are no characters between lines of vertical writing or the blank space of the page margins, the number of borders (B) will be zero (0). When the line spacing is equal, the number of lines increases and, hence, the number of borders (B) increases as the document size increases. That is, the number of borders (B) is dependent on the number of characters, position of line Ly, and document size.

Then, the difference ΔD [ΔD=|D(n)−D(n+1)|] of the pixel values between each border pixel and the following adjacent pixel is calculated (#73), and the calculated values are added. That is, the sum [S=Σ|D(n)−D(n+1)|] of the differences of the pixel values in line Ly are calculated (#74).

Finally, the edge intensity (E) is calculated via the previously mentioned equation (1) (#75). Edge intensity (E) is the average value of the change in density at the border between text and background in the target line Ly.

The sharpness distribution is quantified as shown in FIG. 4(C) by calculating the edge intensity (E) at each pixel position (pixel no. Y) of all lines in the viewing direction.

Image reading system 1 executes data processing to correct the sharpness of each pixel position in the viewing direction in accordance with the calculated edge intensity (E) as described in summary above. Specifically, a highlight coefficient k of equation (3) using a well known sharpening process is increased or decreased in accordance with the edge intensity (E).

$$D'=D+k(D+F)$$

D': pixel valu7e after correction
D: pixel value before correction
k: highlight coefficient
F: filter to extract high frequency component There is a negative correlation between the edge intensity (E) and the highlight coefficient k such that high spatial frequency components are often added in lines having a large edge intensity value (E) (e.g., lines within defocused region A2), and high spatial frequency components are not added in lines having a small edge intensity value (E). In this way the sharpness of the read image is regularized, such that a read image of identical quality to the read document can be output to an external device. No sharpness correction is executed for lines having zero borders (B).

Figure 6:
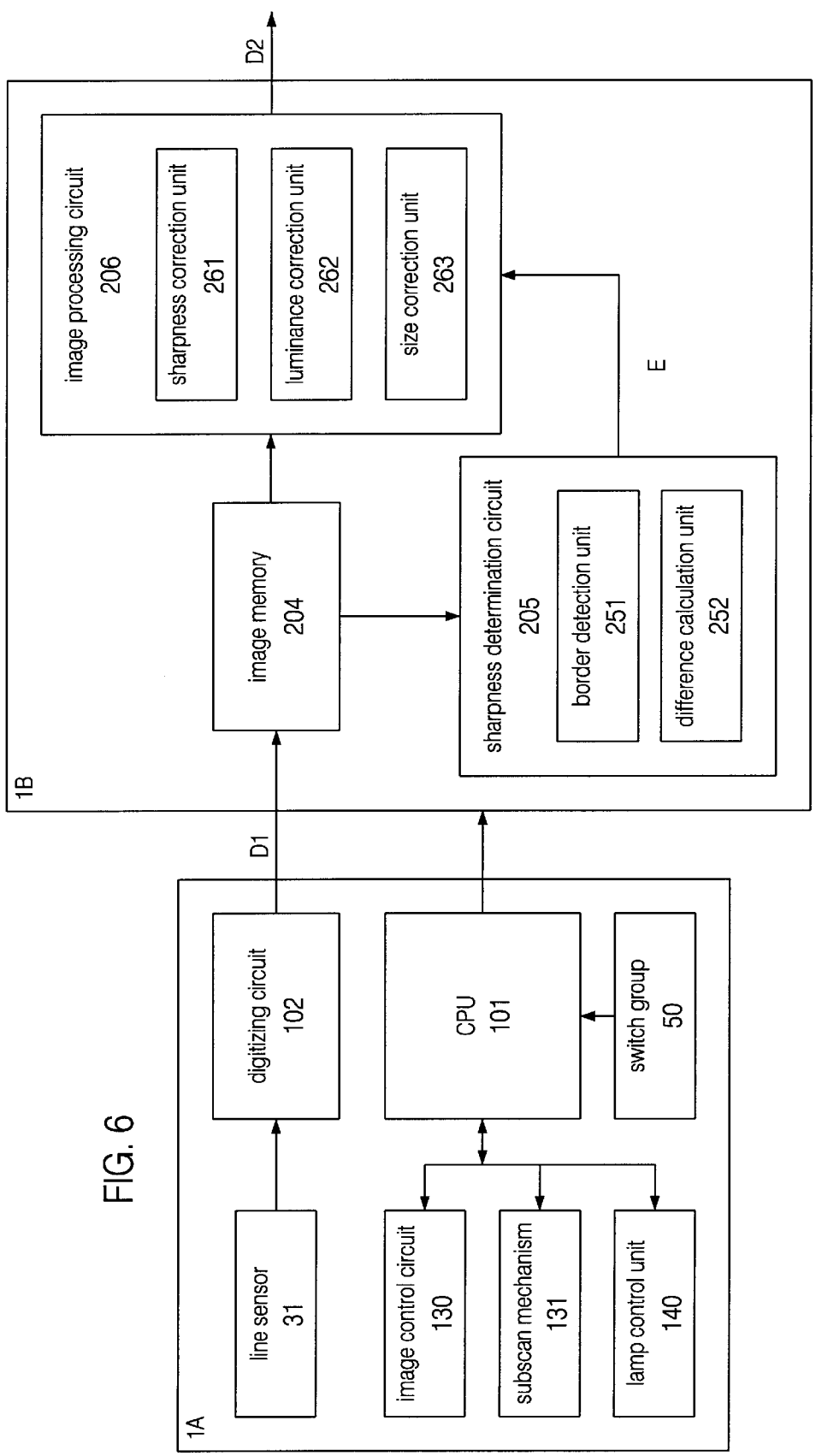
FIG. 6 is a block diagram showing the essential functions of the image reading system.

FIG. 6 is a block diagram showing the essential functions of the image reading system 1.

Image reading system 1 is controlled by CPU 101 provided with a microcomputer. CPU 101 is built into book scanner 1A, and provides instructions to image sensing control circuit 130 to control the actuation of line sensor 31, subscan mechanism 131 to move line sensor 31, lamp control circuit 140 to control the ON/OFF switching of lamp unit 40, and data processing unit 1B. Switch group 50 including buttons on operation panel OP is connected to CPU 101, and data processing unit 1B is provided with image memory 204, sharpness determination circuit 205, and image processing circuit 206.

Photoelectric conversion signals output from line sensor 31 are converted, for example, to 8-bit image data and subjected to shading correction in a digitizing circuit 102 within book scanner 1A. Image data D1 output in the pixel array sequence form digitizing circuit 102 are transmitted to data processing unit 1B, and temporarily stored in image memory 204. Image memory 204 is capable of storing data of a plurality of readings of a maximum reading size (e.g., A3).

Sharpness determination circuit 205 is provided with a border detection unit 251 to extract border pixels and count the borders (B), and a difference calculation unit 252 to calculate the sum (S) of the differences of pixel values, and determines the edge intensity (E) by reading out image data D1 line by line from image memory 204. The edge intensity (E) is transmitted to image processing circuit 206. Image processing circuit 206 is provided with a sharpness correction unit 261 to correct pixel value via the aforesaid equation (3), luminance correction unit 262 to optimize the output density, and size correction unit 263 to variably magnify an image in accordance with a specified operation. Image data D2 (read image) which have been subjected to predetermined image processing are output to an external device.

The previously described embodiment realizes reduced reading time and cost reduced by eliminating a measuring mechanism because sharpness is regularized without scanning to measuring the document height distribution. Furthermore, since the amount of correction is set based on information of the read image itself, such correction may be accomplished at an optional time if the read image is stored in memory. Batch correction processing is also possible. Since the degree of sharpness of each line can be accurately evaluated regardless of the number of characters or their distribution within a page, the quality of a read image can be increased by the addition of edge processing suitable to an image predominantly of text.

Although an image reader of the face-upward document placement type is described in the example of the previously described embodiment, it is to be understood that the present invention is applicable to image reader of the face-downward document placement type. Data processing unit 1B may also be built into book scanner 1A.

The present invention reduces image reading time and regularizes image quality when reading open-faced documents.

Although the present invention has been fully described by way of examples with reference to the accompanying drawings, it is to be noted that various changes and modification will be apparent to those skilled in the art.

Therefore, unless otherwise such changes and modifications depart from the scope of the present invention, they should be construed as being included therein.

What is claimed is:

1. An image processing device comprising:
    a dividing section for dividing image data into a plurality of regions;
    a detector for detecting a degree of sharpness of each of the plurality of regions in the image data; and
    a correction section for correcting image data of a respective region of the image data based on the thus detected degree of sharpness of the respective region to make the degree of sharpness of each of the plurality of regions substantially equal.

2. An image processing device according to claim 1, wherein said detector is adapted to count border pixels having a different value than the value of a corresponding adjacent pixel on one side thereof and calculates a difference of pixel value of each said border pixel and the corresponding adjacent pixel on one side thereof.

3. An image processing device according to claim 2, wherein said detector calculates said degree of sharpness of each of the plurality of regions in accordance with a number of said border pixels in the respective region and a sum of said differences of pixel values in the respective region.

4. An image processing device according to claim 1, wherein said correction section corrects a sharpness of each said region.

5. An image reading system comprising:
    an image sensor which converts an image of a document to image data;
    a dividing section for dividing the image data into a plurality of regions;
    a detector for detecting a degree of sharpness of each of the plurality of regions in the image data; and a correction section for correcting image data of a respective region of the image data based on the thus detected degree of sharpness of the respective region to make the degree of sharpness of each of the plurality of regions substantially equal.

6. An image reading system according to claim 5, wherein said detector is adapted to count border pixels having a different value than the value of a corresponding adjacent pixel on one side thereof and calculates a difference of pixel value of each said border pixel and the corresponding adjacent pixel on one side thereof.

7. An image reading system according to claim 6, wherein said detector calculates said degree of sharpness of each of the plurality of regions in accordance with a number of said border pixels in the respective region and a sum of said differences of pixel values in the respective region.

8. An image reading system according to claim 5, wherein said correction section corrects a sharpness of each said region.

9. An image reading system according to claim 5, wherein said image sensor is a line image sensor.

10. An image reading system according to claim 9, wherein each region of said plurality of regions corresponds to a respective line of said image data outputted by said line image sensor.

11. An image reading system having an image sensing means to convert an image of an open-faced document to image data in a plurality of pixel arrays in a viewing direction and a vertical direction perpendicular to said viewing direction, said image reading system comprising:

a counter to count border pixels of image data outputted by said image sensing means, each of the border pixels having a value which is different from a value of a corresponding adjacent pixel on one side thereof in said vertical direction;

a calculation section to calculate a difference of pixel value between each said border pixel and a corresponding adjacent pixel on one side thereof in said vertical direction; and an image correction section to correct pixel values in each of said plurality of pixel arrays in accordance with an image quality specified by a sum of said differences of pixel values within each respective pixel array, and in accordance with the number of said border pixels within each respective pixel array.

12. An image processing method comprising steps of:

dividing image data into a plurality of regions;

detecting a degree of sharpness of each of the plurality of regions in the image data; and correcting image data of a respective region of the image data based on the thus detected degree of sharpness of the respective region to make the degree of sharpness of each of the plurality of regions substantially equal.

13. An image processing method according to claim 12, wherein the detecting step includes the steps of:

counting a number of border pixels in each of the plurality of regions;

calculating a difference in pixel values between each border pixel and a corresponding adjacent pixel on one side thereof; and calculating the degree of sharpness of each of the plurality of regions based on the number of border pixels in the respective region and a sum of the differences in pixel values in the respective region.

* * * * *